March 20, 1962 P. L. CIACCIO 3,025,547
REEL FEED TRANSMISSION FOR CABLE FEED APPARATUS FOR
SEWER CLEANING FLEXIBLE DRIVE CABLE AND THE LIKE
Filed June 3, 1959 6 Sheets-Sheet 1

INVENTOR.
PETER L. CIACCO
BY
ATTORNEY

INVENTOR.
PETER L. CIACCO
BY
ATTORNEY

INVENTOR.
PETER L. CIACCO

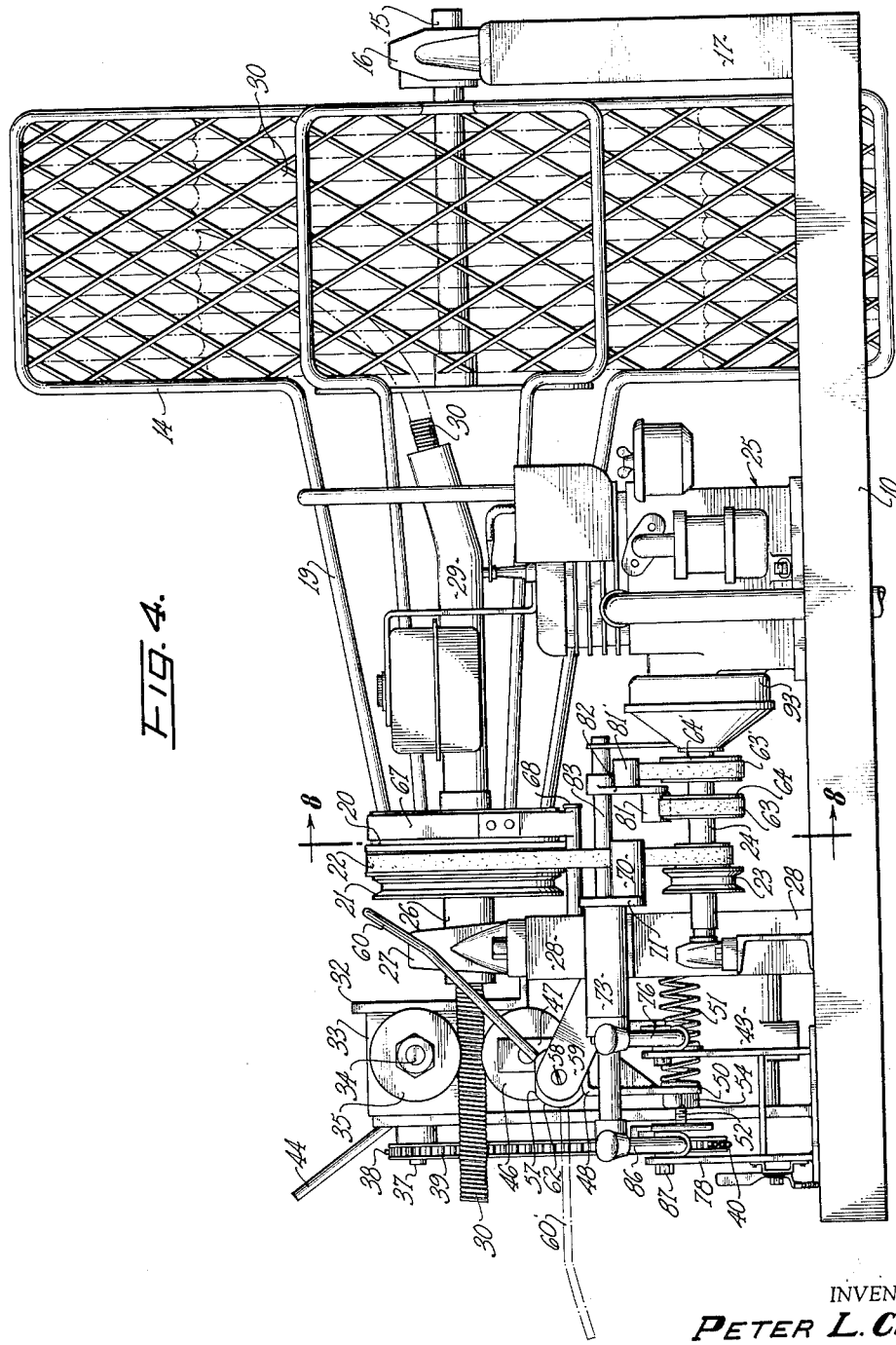

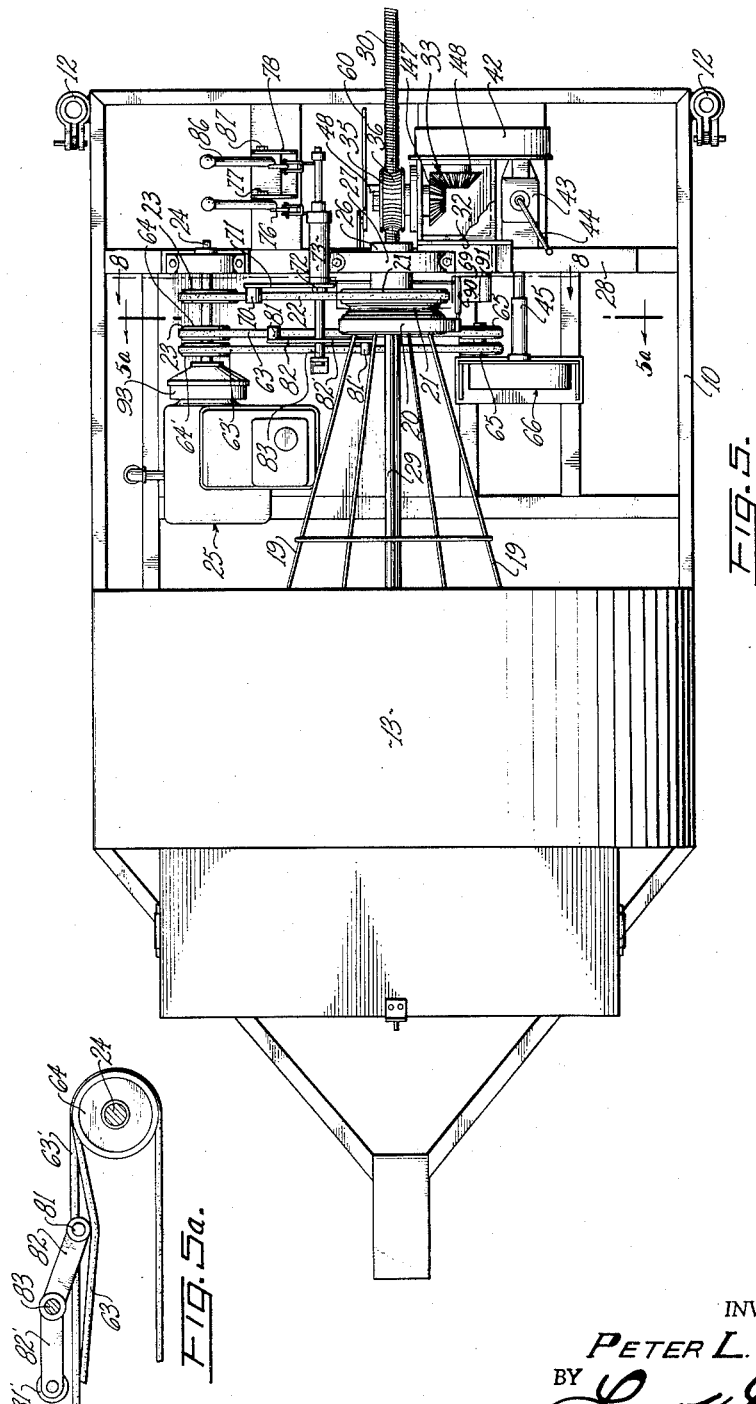

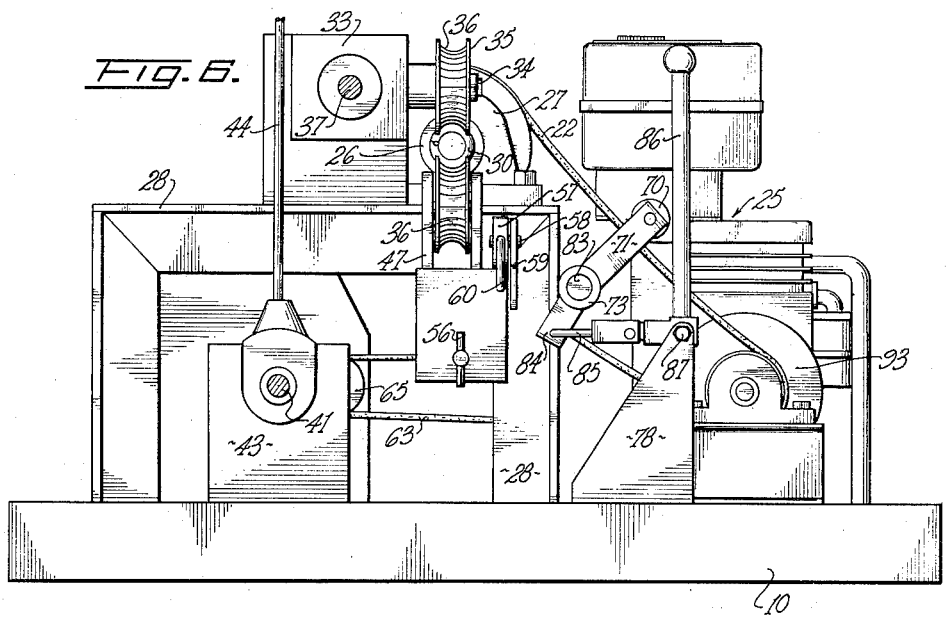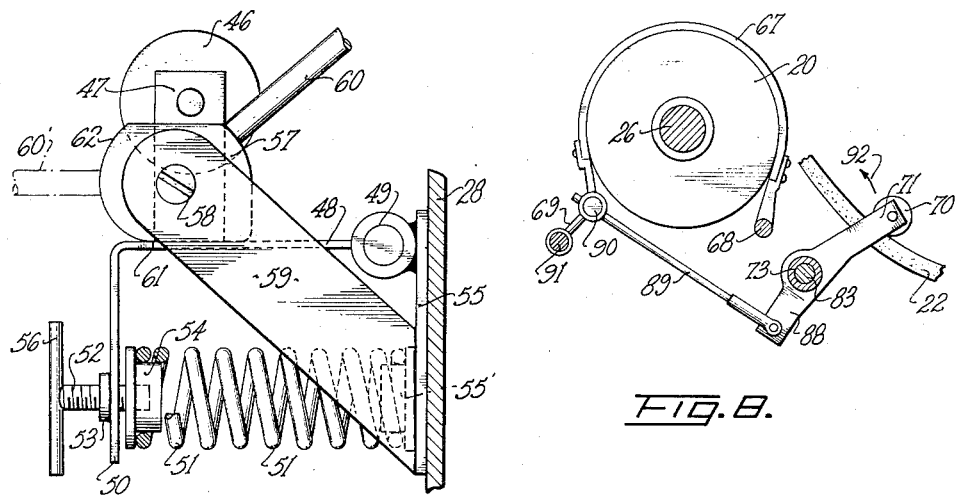

United States Patent Office
3,025,547
Patented Mar. 20, 1962

3,025,547
REEL FEED TRANSMISSION FOR CABLE FEED APPARATUS FOR SEWER CLEANING FLEXIBLE DRIVE CABLE AND THE LIKE
Peter L. Ciaccio, 9059 Venice Blvd., Los Angeles, Calif.
Filed June 3, 1959, Ser. No. 817,819
13 Claims. (Cl. 15—104.3)

This invention relates to apparatus for feeding and rotatably driving flexible cable of the type utilizing a closed-coil helically coiled tubular rod construction, commonly referred to as "coil-rod."

The invention is particularly concerned with the problems involved in simultaneously feeding and rotatably driving a coil rod of heavy duty construction (commonly or 1¼" and 1" diameter) in the driving of various cleaning and cutting tools used in the cleaning of municipal sewers. Such apparatus requires a power source of substantial horse power for driving the coil rod, and power driven feeding and driving apparatus has hitherto been provided for this general purpose. The present invention has as its general object to provide an improved coil rod feeding mechanism in a feeding and driving apparatus of the type in which the coil rod is fed from a storage reel which transmits rotary drive movement to the coil rod as it is fed forwardly by the feeding apparatus.

Hitherto, in this type of apparatus, it has been necessary to arrest the operation of the apparatus in order to disengage the coil rod from the feeding mechanism, whenever that is desirable. Also, it is necessary to arrest or reduce the rate of feed when a cutting tool on the forward end of the coil rod meets an obstruction in the sewer (such as a mass of tree roots) which cannot be cut away nearly as rapidly as the ordinary accumulation of soil and muck.

A particular object is to provide a coil rod feeding and rotating apparatus wherein the coil rod can be released from the feeding means and re-engagement instantaneously effected without stopping the rotation of the coil rod.

A further object is to provide such a rotating and feeding mechanism having a change speed gear transmission and quickly releasable drive means for driving the same from a power source.

A further object is to provide such a rotating and feeding mechanism having forward and reverse drive mechanism.

Another object is to provide such a rotating and feeding mechanism having braking and drive connections to a coil rod rotating reel and having common control means for simultaneously releasing the drive connection and effecting braking, and vice versa.

Other objects will become apparent in the ensuing specifications and appended drawings in which:

FIG. 4 is a right side elevational view of the apparatus;

FIG. 5 is a plan view of the apparatus;

FIG. 5a is a detail sectional view taken on line 5a—5a of FIG. 5 showing the quick-reverse actuator;

FIG. 6 is a front elevational view of the apparatus;

FIG. 7 is a detail side view of the feed-control actuator mechanism; and

FIG. 8 is a sectional view, with parts broken away, showing details of the brake-actuating linkage viewed from the front of the apparatus as indicated by line 8—8 of FIG. 5.

Figure 1:
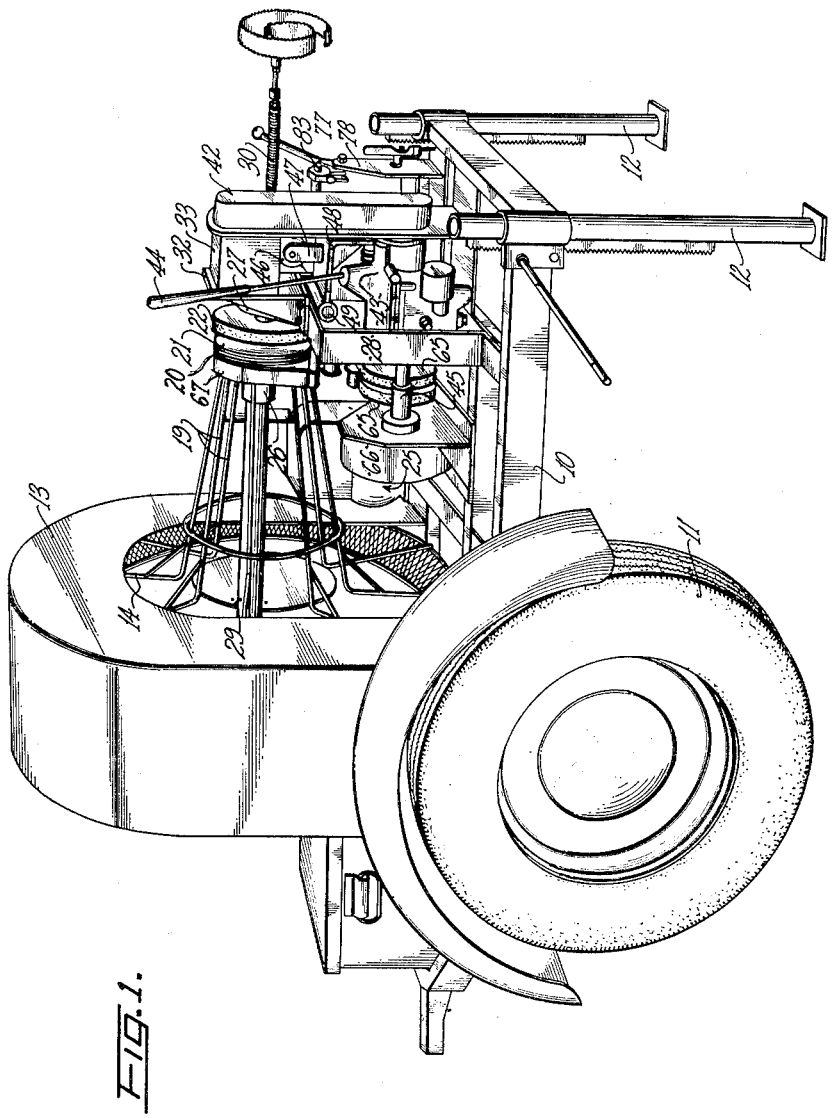
FIG. 1 is a perspective view of a cable feed and drive apparatus embodying my invention, viewed from the left side.

Referring now to the drawings in detail, I have shown therein, as an example of one form in which the invention may be embodied, a reel feed apparatus of a portable, power driven type comprising in general a chassis 10 the rear end of which is mounted upon travel wheels 11 and the forward end of which is provided with a pair of depending, rigid supporting legs 12.

Mounted upon the rear end of the chassis 10 is an arch-shaped reel housing 13 within which a coil rod reel 14 is carried at its rear end (FIG. 4) by a longitudinal shaft 15 which is journalled in a bearing 16 on the upper end of a supporting pillar 17 rising from the rear end of bed 10. Projecting forwardly from the central area of reel 14 is a guide cage 19 which has at its forward end a guide head including brake drum 20 and a driven pulley 21 receiving drive through a belt 22 from a drive pulley 23 on a drive shaft 24 which is driven by a motor 25 (e.g. a gasoline engine as shown). The forward end of this reel mechanism is rotatably supported by a guide nozzle 26 in the form of a cylindrical tube, functioning also as a stub shaft which is journalled in a bearing 27 on the upper end of a supporting arch 28 rising from the bed 10 near its forward end. Guide nozzle is secured in and projects forwardly from the brake drum 20. Secured in the rear end of guide nozzle 26 is a guide tube 29 the rear end of which is bent at an angle to receive the coil rod 30 as it is unreeled from the inner side of an annular roll thereof contained within the reel 14. At this point it may be noted that the rotation of the entire reel assembly will transmit rotation to the coil rod 30, the portion of the coil rod which extends radially from guide tube 29 to the coil of rod within the reel 14 functioning as a crank to transmit torque from the reeled coil to the length of coil rod emerging from the nozzle 26, and the latter serves only as a guide for emitting the coil rod along a properly positioned axis for feeding engagement by the feed rolls which will now be described.

Rising from the left forward corner of bed 10 is a bracket 32 on which is mounted a gear box 33. A horizontal transverse feed roll shaft 34, journalled in gear box 33, carries and drives a feed roll 35 which has a series of concave helical serrations 36 (FIG. 3) arranged for meshing engagement with the helical turns of coil rod 30. Within the gear box 33 are a pair of bevel gears 47 and 48 (FIG. 5) secured on the shaft 34 and on a shaft 37 respectively. Shaft 37 is journalled in the gear box 33 on a longitudinal axis, parallel to the axis of feeding movement of coil rod 30. A sprocket 38 secured on shaft 37 is driven by a chain 39 which in turn is driven by a sprocket 40 on a shaft 41 (FIG. 3) extending longitudinally beneath and parallel to the shaft 37. The parts 38—40 constitute a chain drive which, enclosed in a housing, is indicated generally by the numeral 42 in FIGS. 1 and 2. Shaft 41 is secured to the driven member of a conventional change-speed gear transmission 43 (FIG. 1) such as is used in automobiles, transmission 43 being manually actuated by a shift lever 44. A drive shaft 45 extends into and drives the drive gear cluster of transmission 43.

Figure 2:
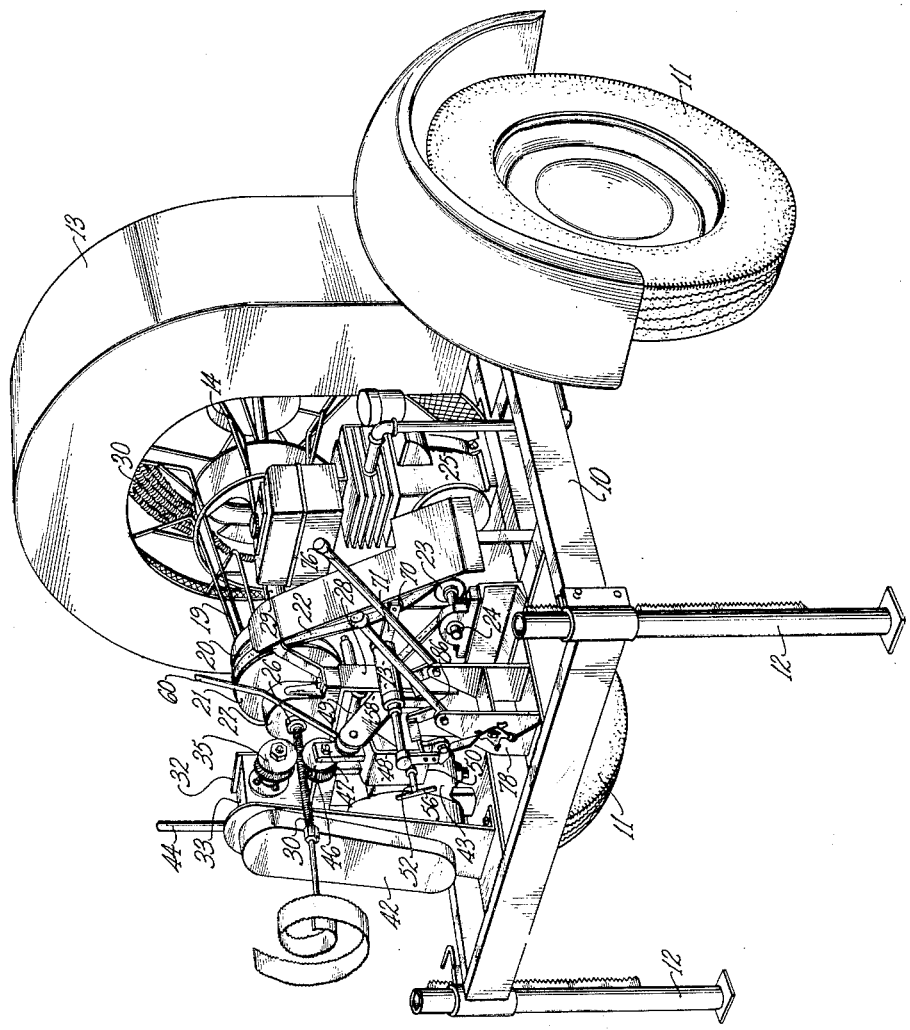
FIG. 2 is a perspective view of the same viewed from the right side.
Figure 3:
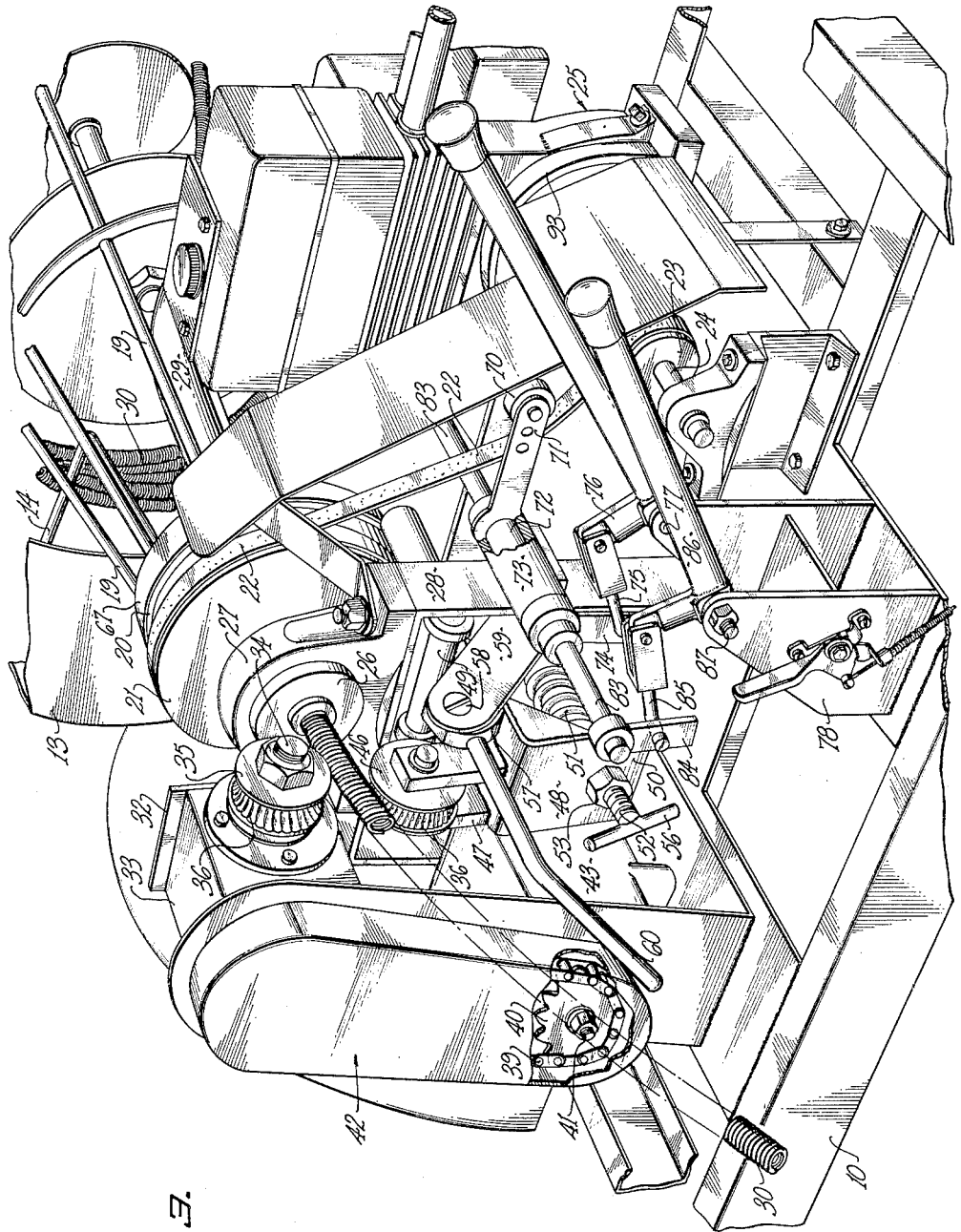
FIG. 3 is a perspective view of the central portion of the apparatus, viewed as in FIG. 2 but on a larger scale.

Referring to FIGS. 2, 3 and 4, the feed roll 35 is one of a pair of rolls, the other being a loading (idler) roll 46 which is rotatably mounted in a clevis 47 mounted on and projecting upwardly from an arm 48 (FIG. 7) that is pivotally attached at 49 to the supporting arm 28. Although not driven, roll 46 has helical serrations 36 for meshing with coil rod 30, avoiding the wearing of the outer surfaces of coil rod 30 which I find would occur through the use of a smooth-faced loading roll. Also, where a smooth-faced roll is used, its face will be helically grooved by wear from the coil rod, and it is preferable that such wear be avoided.

Arm 48, of L-shape, has a depending arm portion 50 which is spring loaded forwardly by a coil spring 51. An adjusting screw 52 is threaded through a nut 53 secured to arm portion 50, extends rearwardly through the arm 50 and at its rear end has a pivotal thrust connection with an end bearing 54 which transmits the thrust to coil spring 51. The rear end of coil spring 51 is compressively abutted against a pilot fitting 55' on a bracket 55 which mounts the pivot 49 on the arms 28, whereby rotation of screw 52 by its handle 56 may be utilized to adjust the compressive loading of spring 51, spring-loading the idler roller 46 upward for engagement with the underside of coil rod 30. Pivotal movement of arm 48 will be effective to lower or raise the idler roller 46 for adjustment of its coil rod engaging position.

In a normal position, idler roller 46 will be spring loaded upwardly against the coil rod 30 by the upward component of the compressive load of spring 51 against arm portion 50 which, being applied at a substantial distance below the pivot 49, will be resolved into a force tending to swing the arm 48, 50 upwardly and forwardly, and the upward spring loading of roller 46 is a component of this upwardly forwardly directed compressive load. The upward loading is varied by operating the screw 52 to adjust the compression of the spring 51.

From the normal operating position referred to above, the loading roller 46 may be shifted downwardly to release the coil rod 30 from driving engagement with feed roll 35. This is provided for by a cam 57 having trunnions journalled in a bracket 59 secured to and projecting upwardly and forwardly from arch 28. A handle 60, secured in cam 57 and projecting radially therefrom, provides for manual rotation of the cam 57 from the position shown in FIG. 7 wherein a chordal flat face 61 of the cam seats flatly against the upper face of arm 48, to a forwardly extending position indicated at 60', wherein the arm 48 is engaged by the high surface 62 of the cam and is thereby depressed so as to lower the roller 46 to its release position as shown in FIG. 3.

Drive to the transmission input shaft 43 is provided for by a quick-reverse drive comprising a pair of belts 63, 63' connecting pulleys 64, 64' on drive shaft 24 to pulleys 65, 65' on coaxial input shafts of a quick-reverse unit indicated generally at 66 in FIG. 1, such unit embodying a construction such as that disclosed in my U.S. patent application S.N. 677,400, for Power Drive, filed August 9, 1957, allowed August 13, 1958, Patent No. 2,844,796 to be issued May 5, 1959, wherein drives of mutually opposite direction are transmitted through spur gear and chain sprocket trains respectively from the respective input shafts one of which is tubular and telescopes the other.

The invention provides a brake (FIG. 8) comprising the brake drum 20, a brake band 67 extending around the majority of the periphery of band 20 having one end attached to a stud 68 anchored to arch 28, and having its other end pivoted to a swinging anchor 69.

The drive to reel 14 is controlled by a belt tightener comprising a roller 70 engaging the belt 22, roller 70 being carried by a crank arm 71 on the rear end of a tubular crank shaft 72 (FIG. 3) that is journalled in a bearing sleeve 73 secured to the rightward side of supporting arch 28. An arm 74, secured to and depending from the forward end of crank shaft 72, is connected by a push-pull link 75 to a bell crank lever 76 for manual shifting of the belt tightener. Lever 76 is fulcrumed, on a pivot 77, in a bracket 78 mounted on the forward rightward corner of the chassis 10.

The feed roll drive through belts 63, 63' is controlled by a belt tightener including rollers 81, 81', crank arms 82, 82' on which rollers 81, 81' are carried, a crankshaft 83 on the rear end of which crank arms 82, 82' are secured, a crank arm 84 (FIG. 3) secured to and projecting downwardly from the forward end of shaft 83, a link 85 linked to arm 84, and an operating lever 86, fulcrumed by a pivot 87 to bracket 78. The shaft 83 extends through and is rotatably mounted in the tubular crank shaft 72.

An operating arm 88 (FIG. 8) is formed as an extension of belt tightener arm 71 and is connected by a link 89 to a pivot 90 which connects brake band 67 to bracket 69, the latter being swingingly mounted on a stud 91 anchored to arch 28. The arrangement is such that the movement of belt tightener arm 71 in the direction indicated by arrow 92, to release the tension in reel drive belt 22 will be accompanied by the tightening of brake band 67 on brake drum 20 to arrest the movement of reel 14. FIG. 8 shows the linkage in brake-applying position.

A gear reduction transmission 93 connects the shaft 24 to the motor 25 to provide correct speed of drive to the reel and to the feed rolls.

*Operation*

In the operation of the apparatus, with the levers 76 and 86 both adjusted to belt tightening positions, the reel 14 will be rotated by the driving operation of belt 22 and the reel feed rolls 35, 46 will be driven from the belt 63 (or belt 63', depending on whether lever 86 is in forward or reverse position). The rotation of reel 14 will be transmitted to the coil rod 30 for driving a cleaning implement on the forward end of the latter. With the feed roll release lever 60 in the position shown in FIG. 4, the coil rod 30, at the election of the operator, can be pulled forwardly by hand (as during a stage of initial insertion of the coil rod into an open portion of a sewer line prior to the cutting tool encountering an obstructing body of muck) and when it is desired to establish the automatic forward feed of the coil rod 30 for normal muck-removing operations, the lever 60 will be shifted rearwardly to the position shown in FIG. 7. The loading roll 46 will thus be elevated, pressing the coil rod 30 upwardly against the driving roll 35 so that the rotation of the latter will effect forward feeding of the coil rod 30 at a uniform rate determined by the gear ratio of the apparatus. Should the cutting tool then encounter a more resistant obstruction (such as a mass of tree roots) such that the forward feed at the automatic feed rate cannot be maintained, the lever 60 can be intermittently shifted forwardly to disengage the automatic feed and rearwardly to re-engage it, thus feeding the coil rod 30 forwardly at a rate which, in the judgment of the operator, will result in satisfactory operation of the apparatus on a slowed-feed basis. If the obstruction is of such an unyielding nature that the cutting tool is completely stopped (as evidenced by the coil rod 30 commencing to kink) the feed rolls 35, 46 may be allowed to remain disengaged while the operator retards or arrests the rotation of reel 14 by manipulation of the reel drive belt tightener actuator lever 76 to intermittently or otherwise break or reduce the drive through belt 22. It is possible for the operator to simultaneously manipulate both of the levers 60 and 76, using his right hand for the lever 76 and his left hand for the lever 44, if a complete stoppage of the cutting tool occurs with such suddenness as to tend to damage the apparatus.

I claim:

1. In an apparatus for reel-feeding and rotating a flexible drive cable of helically coiled construction, for a sewer cleaning tool, in combination: a reel for the cable; a nozzle for directing the cable axially from the reel as it issues therefrom; means for rotating the reel and thereby rotating the cable as it issues from the nozzle; a pair of feed rolls of sheave form, in radially-spaced opposition, in a common plane, embracing said cable between their peripheries, at least one of said feed rolls being provided with concave helical serrations meshing with the helical turns of said cable; means for power-driving one of said rolls to push said cable forcibly into a sewer; a bracket means mounting the other roll and mounted on a fixed part of said apparatus for movement such as to effect adjustment of the peripheral spacing of said rolls to establish and release feeding engagement of said cables between said rolls; means acting between said bracket and said fixed part for constantly spring-loading said bracket in a direction to establish driving engagement of said other roll against said cable; and means acting positively between said bracket and said fixed part for directly moving said bracket against the opposition of said spring-loading means for quick manual actuation of said other feed roll between its positions of such adjustment.

2. In an apparatus for reel-feeding and rotating a flexible drive cable of helically coiled construction, for a sewer cleaning tool, in combination: a pair of feed rolls of sheave form, in radially spaced opposition in a common plane, embracing said cable between their peripheries, at least one of said rolls being provided with concave helical serrations meshing with the helical turns of said cable to transmit feeding movement thereto; guide means for directing the cable between said rolls while the cable is being rotated; means for power driving one of said rolls to push said cable forcibly into a sewer; bracket means mounting the other roll for adjustment of the peripheral spacing of said rolls to establish and release feeding engagement of said cable between said rolls; spring means acting in compression between a fixed part of said apparatus and said bracket, means spring-loading one of said rolls into engagement with said cable; means for adjusting the spring-loading thereof; and means, operable independently of said adjustment means, and acting positively between said fixed part and bracket means for quick manual actuation of said other feed roll between its positions of such adjustment without arresting the rotation of said cable.

3. In an apparatus for reel-feeding and rotating a flexible drive cable of helically coiled construction, for driving a sewer cleaning tool, in combination: means for power-rotating the cable while permitting it to move longitudinally; a pair of feed rolls of sheave form, in radially-spaced opposition in a common plane embracing said cable between their peripheries, at least one of said rolls being provided with concave helical serrations meshing with the helical turns of said cable to move longitudinally between said feed rolls while permitting rotation thereof; means for power driving at least one of said rolls to push said cable forcibly into a sewer; means mounting the other roll for adjustment thereof radially toward and from said one roll to vary the peripheral spacing of said rolls for establishing and releasing feeding engagement of said cable therebetween, said mounting means including a movable bracket having bearing means in which said other roll is journalled, means constantly spring loading said bracket in a direction to establish driving engagement of said other roll against said cable; and quickly operable manual actuator means operable against said bracket for directly moving the same against the opposition of said spring-loading means for retracting said other roll to its cable releasing position in opposition to said spring loading means.

4. Apparatus as defined in claim 3, including means operable independently of said manual actuator means for varying the loading of said spring loading means.

5. In an apparatus for reel-feeding and rotating a flexible drive cable of helically coiled construction, for driving a sewer cleaning tool, in combination: a reel for holding the cable in reeled condition; means mounting said reel for rotation for transmitting driving rotation to said cable; a nozzle at the axis of rotation of said reel for directing the cable axially therefrom during the driving rotation of the cable; a pair of feed rolls of sheave form, in radially spaced opposition in a common plane, embracing said cable between their peripheries, at least one of said rolls being provided with concave helical serrations meshing with the helical turns of said cable to transmit feeding movement thereto while accommodating the driving rotation of the cable therebetween; means for power-driving one of said rolls to push said cable forcibly into a sewer; means mounting the other roll for adjustment of the peripheral spacing of said rolls to establish and relieve feeding engagement of said cable between said rolls; a movable bracket having bearing means in which said other roll is journalled; a coil spring acting under compression between said bracket and a fixed part of said apparatus in a direction to establish spring-loaded driving engagement of said other roll against said cable; and quickly operable manual actuator means carried by said fixed part and movable into direct engagement with said bracket and operable thereon for moving the same, further compressing said coil spring, to release said driving engagement.

6. In an apparatus for reel-feeding and rotating a flexible drive cable of helically coiled construction, for driving a sewer cleaning tool, in combination: a frame; a reel for holding the cable in reeled condition; means mounting said reel on said frame for rotation for transmitting driving rotation to said cable; a nozzle at the axis of rotation of said reel for directing the cable axially therefrom during the driving rotation of the cable; a pair of feed rolls of sheave form, in radially spaced opposition in a common plane, embracing said cable between their peripheries, at least one of said rolls being provided with concave helical serrations meshing with the helical turns of said cable to transmit feeding movement thereto while accommodating the driving rotation of the cable therebetween; means for power-driving one of said rolls to push said cable forcibly into a sewer; a support rising from said frame; a bracket of L-form including a horizontal arm having one end pivoted to said support for vertical movement and a vertical arm extending from the other end of said horizontal arm, said bracket mounting the other roll for adjustment of the peripheral spacing of said rolls to establish and release feeding engagement of said cable between said rolls; a spring engaged between the end of said vertical arm and said support, spring loading said bracket for yielding engagement of said other roll against said cable; means operable between said spring and bracket for adjusting the spring-loading and manual actuator means quickly operable independently of said adjusting means, engaging said horizontal arm, to move the same away from its pivotal connection to said support, thereby to shift said other roll to its release position against the yielding opposition of said spring.

7. Apparatus as defined in claim 6, wherein said spring is a coil spring engaged under compression between said vertical arm and said support, and further including an adjusting screw threaded through the end of said vertical arm and engaged between said vertical arm and the adjacent end of said coil spring for varying the loading of said coil spring.

8. Apparatus as defined in claim 7, wherein said actuator means comprises a cam pivotally mounted on said support and engaging said horizontal arm at its end remote from its pivotal connection to said support, and a lever secured to said cam for rotating the same between positions of minimum and maximum depression of said bracket.

9. In an apparatus for reel-feeding and rotating a flexible drive cable of helically coiled construction, for driving a sewer cleaning tool, in combination; means for power-rotating the cable while permitting it to move longitudinally; a pair of feed rolls of sheave form, in radially-spaced opposition in a common plane embracing said cable between their peripheries, at least one of said rolls being provided with concave helical serrations meshing with the helical turns of said cable to move it longitudinally between said feed rolls while permitting rotation thereof; means for power driving at least one of said rolls, to push said cable forcibly into a sewer; means mounting the other roll for adjustment thereof radially toward and from said one roll to vary the peripheral spacing of said rolls for establishing and releasing feeding engagement of said cable therebetween, said mounting means comprising a bracket of L-configuration including a horizontal arm extending below and parallel to the axis of feeding movement of said cable between said rolls and a vertical arm integral with and extending downwardly from one of said horizontal arm, bearing means carried upon and above said one end of said arm, in which said other roll is journalled for rotation, stationary support means to which the other end of said horizontal arm is attached in a manner to provide for vertical swinging movement of said one end thereof to effect said adjustment of said other roll, a coil spring disposed below said horizontal arm, substantially parallel thereto, and engaged under compression between said fixed support and the lower end of said vertical arm, said spring constantly spring-loading said bracket upwardly to establish driving engagement of said other roll against said cable; and quickly operable manual actuator means acting between said fixed support and said one end of said horizontal arm for positively adjusting the same downwardly, further compressing said spring and retracting said other roll away from driving engagement with said cable.

10. Apparatus as defined in claim 9, including threaded adjustment means interposed between said lower end of said vertical arm and the adjoining end of said spring and operable to adjust the compression in said spring, thereby adjusting the spring loading of said other roller in its driving engagement with the cable.

11. Apparatus as defined in claim 10, wherein said threaded adjustment means comprises an adjusting screw threaded through said lower end of said vertical arm, an end bearing interposed between the inner end of said adjustment screw and said spring, and means on the outer end of said adjustment screw for manual actuation thereof.

12. Apparatus as defined in claim 10, wherein said manual actuator means comprises a cam and a handle lever secured thereto for rotating the same, said fixed support means including a bracket arm projecting therefrom alongside said horizontal bracket arm, and a pivot connecting said cam to said horizontal arm on an axis disposed above and transverse to the free end of said horizontal arm, said cam having a high surface which is operable when moved into engagement with said free end, to adjust the latter downwardly for said retracting of said other roll.

13. Apparatus as defined in claim 10, wherein said manual actuator means comprises a cam and a handle lever secured thereto for rotating the same, said fixed support means including a bracket arm projecting therefrom alongside said horizontal bracket arm, and a pivot connecting said cam to said horizontal arm on an axis disposed above and transverse to the free end of said horizontal arm, said cam having a high surface which is operable when moved into engagement with said free end, to adjust the latter downwardly for said retracting of said other roll, said cam further having a generally flat face adjoining said high surface, normally disposed on its lower side and in contact with said free end of said horizontal arm to permit the latter to assume an upper limit position wherein said other roll is in driving engagement with said cable, and said cam further having an abutment shoulder adjoining the end of said flat face nearest said other end of said horizontal arm, engageable with said horizontal arm when said flat face is in said normal position, to hold said cam in said normal position in response to the spring loading of said horizontal arm against said flat face.

References Cited in the file of this patent
UNITED STATES PATENTS

| | | |
|---|---|---|
| 420,476 | Thayer | Feb. 4, 1890 |
| 619,692 | Perry | Feb. 14, 1899 |
| 2,102,917 | Rolland | Dec. 21, 1937 |
| 2,210,300 | Magruder | Aug. 6, 1940 |
| 2,223,005 | Kerber | Nov. 26, 1940 |
| 2,282,600 | Blanc | May 12, 1942 |
| 2,488,039 | Sketchley | Nov. 15, 1949 |
| 2,884,796 | Ciaccio | May 5, 1959 |